United States Patent [19]

Lang

[11] 4,212,558
[45] Jul. 15, 1980

[54] COUPLER FOR CABLES TENSIONED ONE END AGAINST ANOTHER END

[76] Inventor: Frederic A. Lang, Good Hope Rd., Landenberg, Pa. 19350

[21] Appl. No.: 939,491

[22] Filed: Sep. 5, 1978

Related U.S. Application Data

[63] Continuation-in-part of Ser. No. 714,350, Aug. 16, 1976.

[51] Int. Cl.² .............................................. F16B 2/14
[52] U.S. Cl. ...................................... 403/41; 403/215; 403/393
[58] Field of Search .................. 403/215, 393, 206, 41, 403/211, 396, 389, 390; 52/224, 248; 217/96

[56] References Cited

U.S. PATENT DOCUMENTS

| 2,166,847 | 7/1939 | Miller et al. ......................... 24/28 X |
| 3,938,902 | 2/1976 | Morell .............................. 403/314 X |

FOREIGN PATENT DOCUMENTS

| 220691 | 4/1962 | Austria ................................... 403/209 |
| 666307 | 5/1929 | France ................................... 403/206 |
| 1401361 | 4/1965 | France ................................... 403/390 |

*Primary Examiner*—Andrew V. Kundrat

[57] ABSTRACT

A self-equilibrating coupler suitable for simultaneous tensioning of two ends of cable, said coupler having two uniformly curved surfaces in one plane, in fixed position one to the other, the two curved surfaces curving from each other in an amount sufficient to permit jacking and anchoring of both cable ends, the two curved surfaces being separated in the said plane, at the coupler geometric center, in an amount at least as great as twice the diameter of the cable, and the tangents at the entering point of each cable on the curved surface being separated within the plane in an amount equal to one cable diameter.

5 Claims, 8 Drawing Figures

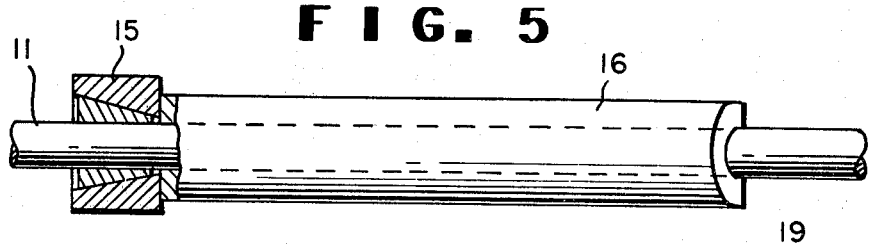
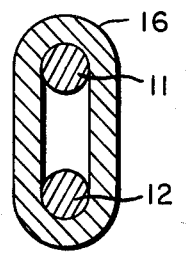 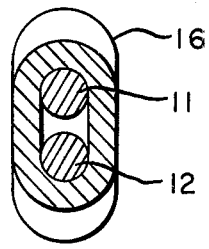
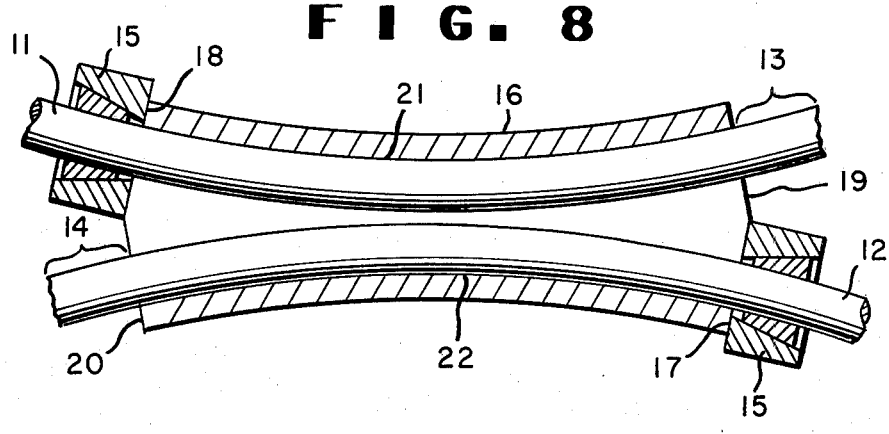

COUPLER FOR CABLES TENSIONED ONE END AGAINST ANOTHER END

BACKGROUND OF THE INVENTION

This application is a continuation-in-part of my U.S. Patent Application Ser. No. 714,350 filed Aug. 16, 1976, and now abandoned.

This invention relates to a new and improved coupler for cables. Cables and rods are used as tension members to carry loads that are created by wind against towers and water against tank walls and for prestressing of concrete by compressing the concrete. In many installations, it is desirable to tension two ends of the cable simultaneously and one end against the other end. This can be done as shown by the prior art by:

1. Forming male threads in right hand direction on one cable end and in left hand direction on other end, then using a right and left hand female threaded coupler which rotates and pulls the two cable ends toward the coupler.
2. Swedging a threaded bracket onto each cable end to permit threaded engagement in a coupler.
3. Utilizing a bracket that has side-by-side two passages for holding the two cable ends in fixed position one to the other and supporting two threaded nuts that can be rotated to pull the two cable ends toward the coupler.
4. Providing a yoke that carries the cable force from one end to the other while passing outside the space occupied by a thread nut or other cable gripping device. Space is allowed also for wrenches to turn the nuts or for a mechanical or hydraulic jack.
5. Abuttments are manufactured on the structure itself to permit use of standard single-end anchoring devices. The prior art devices have one or more of the following problems.

1. Bending moments exist that are large enough to permanently yield the cable material.
2. Threads for use in nuts or threaded couplers are difficult and sometimes impossible to form on cables.
3. Threads are factory formed thereby preventing sizeable field adjustment of cable length.
4. Tensioning by turning a threaded nut is inefficient because of thread friction.
5. Yokes and certain coupler brackets are space consuming and heavy.
6. Abuttments are protrusions which are sometimes not permitted such as on highway surfaces and abuttments in other cases are very consuming of materials as on tank walls.

BRIEF DESCRIPTION OF THE INVENTION

My invention provides an improved coupler for two ends of cable. My coupler is self-equilibrating and comprises a weldment or casting having two uniformly curved surfaces in one plane, in fixed position one to the other. The two curved surfaces curve from each other in an amount sufficient to permit jacking and anchoring of both cable ends. The two curved surfaces are separated in the said plane at the coupler geometric center in an amount of at least as great as twice the diameter of the cable and the tangents on the curve at the entering point of each cable are separated within the plane in an amount equal to one cable diameter. It is preferred that in the manufacture of the coupler that the flat sides of the casting or weldment be separated by an amount equal to the cable diameter plus 0.010 inch to 0.040 inch and in the case of the weldment this is accomplished by the use of two curved steel bars welded between two steel plates. It is further preferred that in the manufacture of the coupler as a ductile iron casting, the uniformly curved surfaces also curved in the transverse direction to support the circular surface of the cable that is bent around the said uniformly curved surfaces. In addition it has been found desirable that the ends of the coupler are shaped so that the end surface is perpendicular to the axis of each cable both at their point of entry and point of exit and that the two uniformly curved surfaces curve from each other in an amount sufficient to permit an anchoring supporting surface on the end of the coupler both at the point of entry and point of exit of each cable.

The invention can best be understood by reference to the drawings.

DESCRIPTION OF DRAWING

FIGS. 5, 6, 7 and 8 are similar to FIGS. 1, 2, 3, and 4 respectfully but show the preferred coupler which is a ductile iron casting.

DETAILED DESCRIPTION OF INVENTION

Figure 1:
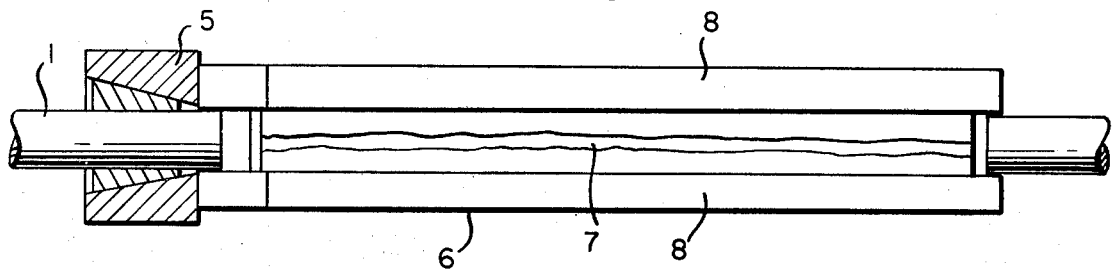
FIG. 1 shows a side view of a coupler from a point in the plane of the axes of two ends of cable.
Figure 2:
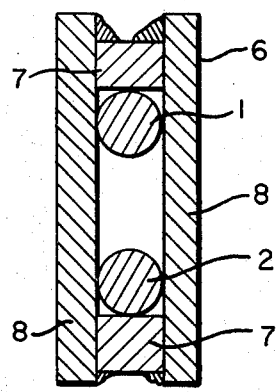
FIG. 2 shows a sectional view of a coupler adjacent to the end of said coupler from a point in the plane of the axes of the two ends of cable.
Figure 3:
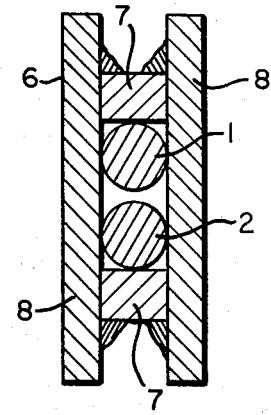
FIG. 3 shows a section view of a coupler with the section at a plane at the center of coupler perpendicular to the axes of two cables.
Figure 4:
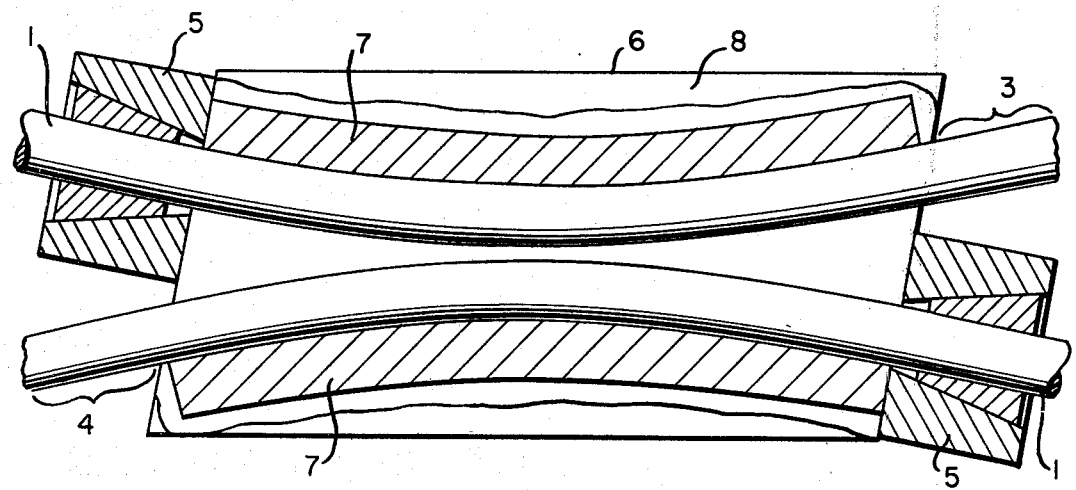
FIG. 4 is a section view of a coupler at the plane of the axes of two cables.

Referring to FIGS. 1, 2, 3 and 4, my coupler is so constructed that when Cable No. 1 and Cable No. 2 are tensioned against each other, an equal force is established in the cables (1) and (2) at cable lengths (3) and (4). When Cables (1) and (2) are locked in tension by cable anchor body and wedges (5) which rest on opposite ends of said coupler (6), the tangents of the curve of each cable axis as the cable enters coupler (6) coincide as does the axis of each cable leaving coupler (6) in each anchor body (5). Hence the cables share a common center line at their point of entry into the coupler. The coupler (6) consists of 2 curved bars (7) welded to two flat plates (8) each plate having a parallelogram shape. Both end surfaces of the plates are perpendicular to the axis of the cable through the anchor body (5) at that end.

Referring to FIGS. 5, 6, 7 and 8, Cable (11) and Cable (12) are tensioned against each other to establish equal forces in the cables (11) and (12) at cable lengths (13) and (14). When Cables (11) and (12) are locked in tension by cable anchor body and wedges (15) which rest on opposite ends of said coupler (16) the tangents of the curve of each entering cable axis as the cable enters the coupler (16) coincide as does the axis of each cable leaving coupler (16) in each anchor body (15) hence the cables share a common center line at their point of entry into the coupler (16). The end surfaces (17) and (18) of the coupler (16) against which the anchors (15) rest are perpendicular to the axis of the cables (11) and (12) respectively at their points of exit from coupler (16). In addition it has been found to be of advantage to have the end surfaces (19) and (20) also perpendicular to the axis of the cables (11) and (12) respectively as the cables enter the coupler (16), hence avoiding the possibility of threading the cables through the coupler the wrong way as can be done with the coupler shown in FIGS. 1 through 4. The two uniformly curved surfaces (21) and (22), see FIG. 8 are also curved in the transverse direction to provide support in semicircular form of the cables (11) and (12) as shown in FIGS. 6 and 7.

What is claimed is:

1. A self-equillibrating coupler suitable for simutaneously tensioning of two ends of cable, said coupler having two uniformly curved surfaces in fixed position one to the other throughout a single passage, said two uniformly curved surfaces being continously curved longitudinally throughout the length of said passage, the two curved surfaces curving from each other in an amount sufficient to permit jacking and anchoring of both cable ends outside of the coupler, the two curved surfaces being separated radially at the coupler geometric center, in an amount at least as great as twice the diameter of the cable, and the tangents of the longitudinally curved surfaces at the entering point of each cable that are in the plane of the axis of the two cables being separated perpendicularly in an amount equal to one cable diameter, hence permitting the cables to share a common center line at their point of entry into the coupler.

2. The coupler of claim 1 wherein the two curved surfaces are formed of two steel bars welded between two steel plates, said plates being separated by an amount equal to the cable diameter plus 0.010 to 0.040 inch.

3. The coupler of claim 2 in which each steel plate has a parallelogram shaped surface and the end surfaces of the plates are perpendicular to the axis of the cable through the anchor body for said cable at that end of the coupler.

4. The coupler of claim 1 wherein the two uniformly curved surfaces are curved transversely to provide support in semicircular form of the cable conforming to said uniformly curved surfaces.

5. The coupler of claim 1 wherein the two uniformly curved surfaces are curved from each other in an amount sufficient to permit anchoring of cables outside the coupler both at the point of entry and the point of exit of each cable and the end surfaces of said coupler against which the anchor would rest at said points of entry and exit of each cable is perpendicular to the axis of the respective cable at the point of entry and at the point of exit of each cable.

* * * * *